(12) United States Patent
Cheng et al.

(10) Patent No.: US 8,847,511 B1
(45) Date of Patent: Sep. 30, 2014

(54) LIGHT EMITTING DIODE DRIVING CIRCUIT

(71) Applicant: I-Shou University, Kaohsiung (TW)

(72) Inventors: Hung-Liang Cheng, Kaohsiung (TW); Chao-Shun Chen, Kaohsiung (TW)

(73) Assignee: I-Shou University, Kaosiung (TW)

( * ) Notice: Subject to any disclaimer, the term of this patent is extended or adjusted under 35 U.S.C. 154(b) by 0 days.

(21) Appl. No.: 14/017,319

(22) Filed: Sep. 4, 2013

(30) Foreign Application Priority Data

Jun. 18, 2013 (TW) .............................. 102121608 A

(51) Int. Cl.
| | |
|---|---|
| G05F 1/00 | (2006.01) |
| H05B 37/00 | (2006.01) |
| H05B 37/02 | (2006.01) |
| H05B 39/00 | (2006.01) |
| H05B 39/02 | (2006.01) |
| H05B 39/04 | (2006.01) |
| H05B 41/14 | (2006.01) |
| H05B 41/16 | (2006.01) |
| H05B 41/24 | (2006.01) |
| H05B 41/36 | (2006.01) |
| H05B 33/08 | (2006.01) |

(52) U.S. Cl.
CPC .................................. H05B 33/0815 (2013.01)
USPC ................... 315/291; 315/200 R; 315/209 R; 315/246

(58) Field of Classification Search
None
See application file for complete search history.

(56) References Cited

U.S. PATENT DOCUMENTS

| 7,737,643 B2 | 6/2010 | Lys |
| 8,310,165 B2 | 11/2012 | Yao |
| 2011/0068700 A1 | 3/2011 | Fan |
| 2013/0033177 A1* | 2/2013 | Rooijackers et al. ........... 315/85 |

FOREIGN PATENT DOCUMENTS

| TW | I297141 | 5/2008 |
| TW | M399572 | 3/2011 |

OTHER PUBLICATIONS

Cheng et al, "A High-Power-Factor LED Driver with Zero-Voltage Switching-on Characteristics", The 10th IEEE International Conference on Power Electronics and Drive Systems (PEDS'13), Apr. 22-25, 2013, p. 334-p. 339.

* cited by examiner

Primary Examiner — Douglas W Owens
Assistant Examiner — Dedei K Hammond
(74) Attorney, Agent, or Firm — Jianq Chyun IP Office

(57) ABSTRACT

A light emitting diode (LED) driving circuit suitable for driving an LED load is provided. The LED driving circuit includes an AC voltage source, a bridge rectifier, a plurality of diodes, inductors, transistors and capacitors. The diodes, inductors, transistors and capacitors are configured to form a buck-boost converter and a buck converter, where the buck-boost converter and the buck converter share the transistors as active switches. Designer can design the LED driving circuit with zero-voltage switching-on using the diode characteristic of the existing active switches by selecting suitable circuit parameters.

9 Claims, 6 Drawing Sheets

First operation mode Md1($t_0 \sim t_1$)

Second operation mode Md2($t_1 \sim t_2$)

Fifth operation mode Md5($t_4 \sim t_5$)

Sixth operation mode Md6($t_5 \sim t_6$)

LIGHT EMITTING DIODE DRIVING CIRCUIT

CROSS-REFERENCE TO RELATED APPLICATION

This application claims the priority benefit of Taiwan application serial no. 102121608, filed on Jun. 18, 2013. The entirety of the above-mentioned patent application is hereby incorporated by reference herein and made a part of this specification.

BACKGROUND

1. Field of the Invention

The present invention is directed to a non-linear load driving technique and more particularly to a light emitting diode (LED) driving circuit.

2. Description of Related Art

A light emitting diode (LED) has advantages of a small size, a high light emitting efficiency, a long lifespan, a fast response speed, a good color rendering index (CRI) and so on and thus, is widely used. Comparing with a fluorescent tube using mercury, the LED is more environmentally friendly. Thus, in order for power-saving and pollution-free illumination, the LED gradually takes the place of the fluorescent tube.

As for an LED driving circuit using an AC voltage source, a bridge rectifier circuit is commonly adopted to obtain a DC voltage and a large capacitor is used to filter the DC voltage to obtain a stable DC-link voltage served as an input of a high-frequency DC-to-DC switching converter. Generally, such type of LED driving circuit would cause input current distortion. As a result, a great amount of harmonic waves are generated and power factors are low. In order to avoid wave distortion of an AC input current, a power factor corrector (PFC) is typically additionally added to a previous stage of the DC-to-DC converter to form a dual-stage driving structure. Meanwhile, the entire power factors of the LED driving circuit are also enhanced by the function of the PFC. However, such type of LED driving circuit requires more active switches and often results in greater switching losses in a hard switching control mode during periods of switching the active switches.

Under the existing technology, a designer may mitigate the switching losses of the active switches by utilizing a soft-switching control mode. For instance, a commonly used soft-switching control mode may be as two types, zero-voltage switching-on (ZVS) and zero-current switching-on (ZCS). Neither the ZVS nor the ZCS control mode would substantially lead the active switches to power losses during the switching periods.

However, in order to implement the soft-switching control mechanism, it is common to additionally add auxiliary circuits or snubber circuits in the LED driving circuit, while those additional circuits would result in design complexity and cost of the LED driving circuit being increased.

SUMMARY

The present invention is directed to a light emitting diode (LED) driving circuit capable of achieving a control mechanism of zero-voltage switching-on (ZVS) without adding additionally auxiliary circuits or snubber circuits.

The present invention is directed to a light emitting diode (LED) driving circuit, suitable for driving an LED load. The LED driving circuit includes an AC voltage source, a bridge rectifier, a first and a second diodes, a first, a second and a third inductors, a first and a second transistors and a first and a second capacitors. The AC voltage source provides an AC voltage. The bridge rectifier is coupled to the AC voltage source and configured to rectify the AC voltage so as to generate a corresponding DC voltage between a first output terminal and a second output terminal of the bridge rectifier. A cathode terminal of the first diode and an anode terminal of the second diode are jointly coupled to the first output terminal of the bridge rectifier. A first terminal of the first inductor and a second terminal of the second inductor are jointly coupled to the second output terminal of the bridge rectifier. A second terminal of the first inductor is coupled to a cathode terminal of the LED load. A first terminal of the second inductor is coupled to an anode terminal of the first diode. A first terminal of the third inductor is coupled to a cathode terminal of the second diode. A second terminal of the third inductor is coupled to an anode terminal of the LED load. A gate of the first transistor and a gate of the second transistor respectively receive a first control signal and a second control signal. A second source/drain of the first transistor and a first source/drain of the second transistor are jointly coupled to the first output terminal of the bridge rectifier. A second source/drain of the second transistor is coupled to the cathode terminal of the LED load. A first terminal of the first capacitor is coupled to a first source/drain of the first transistor. A first terminal of the second capacitor is coupled to the anode terminal of the LED load. A second terminal of the first capacitor and a second terminal of the second capacitor are jointly coupled to the cathode terminal of the LED load.

In an embodiment of the present invention, the first control signal and the second control signal are complementary pulse-width modulation (PWM) signals to each other, a dead time is between the first control signal and the second control signal, and both the first control signal and the second control signal are disabled within the dead time.

In an embodiment of the present invention, the first transistor and the second transistor respectively switch conduction states in response to the first control signal and the second control signal, such that the inductors and the capacitors are charged or discharged in response to the switching operation of the first transistor and the second transistor, and a driving voltage is generated at the two terminals of the second capacitor.

In an embodiment of the present invention, the first transistor, the second transistor, the first diode, the first capacitor, the first inductor and the second inductors are configured to form a buck-boost converter.

In an embodiment of the present invention, the buck-boost converter is operated in a discontinuous conduction mode (DCM).

In an embodiment of the present invention, the first transistor, the second transistor, the second diode, the second capacitor and the third inductor are configured to form a buck converter.

In an embodiment of the present invention, the buck converter is operated in a discontinuous conduction mode (DCM), and an inductance value of the third inductor satisfies $$L_3 = \frac{(V_1 - V_O)V_1 T_P R_{LED}}{8 V_O^2},$$

wherein $L_3$ is the inductance value of the third inductor, $T_P$ is a period of the first control signal or the second control signal, $R_{LED}$ is an impedance of the LED load, $V_1$ is a cross voltage of the first capacitor, and $V_O$ is a cross voltage of the second capacitor.

In an embodiment of the present invention, the buck converter is operated in a continuous conduction mode (CCM), and an inductance value of the third inductor satisfies $$L_3 \geq \frac{T_P R_{LED}}{4},$$

wherein $L_3$ is the inductance value of the third inductor, $T_P$ is a period of the first control signal or the second control signal, $R_{LED}$ is an impedance of the LED load.

In an embodiment of the present invention, the first inductor and the second inductor use a same magnetic core and coil turns of the first inductor and the second inductor satisfy $$\left(\frac{N_2}{N_1 + N_2}\right) V_1 \geq V_m,$$

wherein $N_1$ and $N_2$ are respectively coil turns of the first inductor and the second inductor, $V_1$ is a cross voltage of the first capacitor, and $V_m$ is an amplitude of the AC voltage.

In light of the foregoing, the present invention is directed to a LED driving circuit capable of achieving a zero-voltage switching-on (ZVS) control mechanism by using diode characteristics of existing active switches with specific circuit configurations and the selection of circuit parameters. The LED driving circuit can have the ZVS feature without configuring additional auxiliary circuits or snubber circuits and thus, can effectively reduce the design and production cost of the LED driving circuit.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
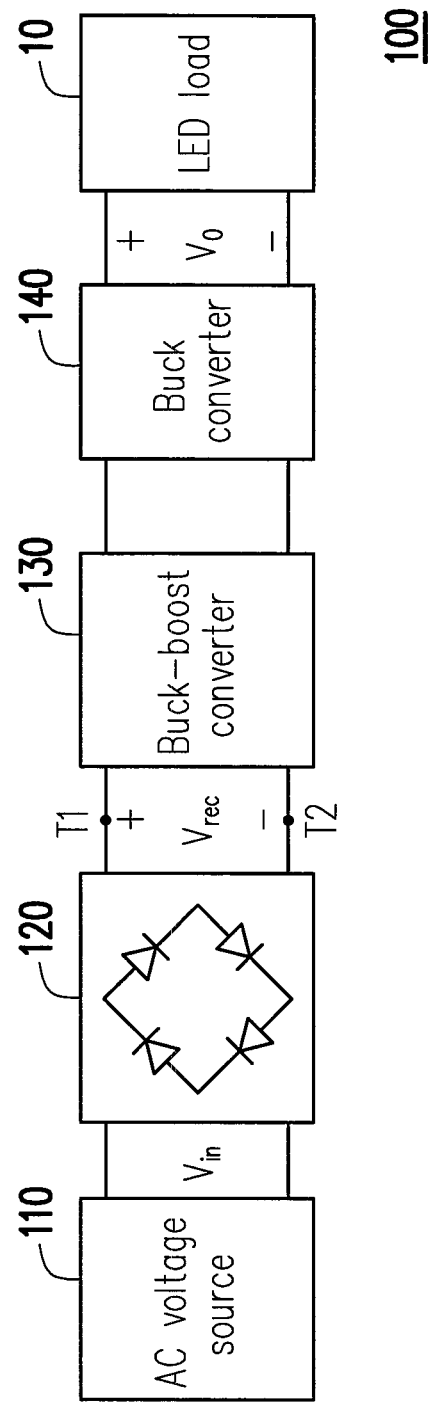
FIG. 1 schematically illustrates a light emitting diode (LED) driving circuit according to an embodiment of the present invention.

According to embodiments of the present invention, a light emitting diode (LED) LED driving circuit is provided, which can achieve a zero-voltage switching-on (ZVS) control mechanism by using diode characteristics of existing active switches with specific circuit configurations and the selection of circuit parameters. The LED driving circuit can have the ZVS feature without configuring additional auxiliary circuits or snubber circuits and thus, can effectively reduce the design and production cost of the LED driving circuit. In order to make the disclosure more comprehensible, embodiments are described below as examples showing that the disclosure can actually be realized. The embodiments provided herein are only for an illustrative purpose, instead of limiting the scope of the disclosure. Moreover, wherever possible, the same reference numbers are used in the drawings and the description of embodiments to refer to the same or like parts.

FIG. 1 schematically illustrates a light emitting diode (LED) driving circuit according to an embodiment of the present invention. In the present embodiment, an LED driving circuit 100 is configured to drive a LED load 10, wherein the LED load 10 may be composed of one or more sets of LED strings connected in parallel, and each of the LED strings may include one or more LEDs connected in series, but the present invention is not limited thereto.

With reference to FIG. 1, the LED driving circuit 100 includes an AC voltage source 110, a bridge rectifier 120, a buck-boost converter 130 and a buck converter 140. The AC voltage source 110 may be configured to provide an AC voltage $V_{in}$. The bridge rectifier 120 is coupled to the AC voltage source 110 to rectify the AC voltage $V_{in}$ and generate a corresponding DC voltage $V_{rec}$ between two terminals T1 and T2 of the bridge rectifier 120. The buck-boost converter 130 and the buck converter 140 form a dual-stage driver.

In the present embodiment, the buck-boost converter 130 served as a first-stage circuit is configured to buck/boost the DC voltage $V_{rec}$ according to a corresponding control signal. The buck-boost converter 130 is configured to be operated in a discontinuous conduction mode (DCM) so as to provide a power factor correction (PFC) function. The buck converter 140 served as a second-stage circuit is configured to buck an output voltage of the buck-boost converter 130 according to another control signal and generate a driving voltage $V_O$ to drive the LED load 10.

Additionally, the control signals configured to control the buck-boost converter 130 and the buck converter 140 may be generated by a control chip (not shown) which is disposed in the LED driving circuit 100. The control chip may control a level of the driving voltage $V_O$ by detecting load characteristics of the LED load 10 (e.g. an actual cross voltage of the LED load 10 or a current actually flowing through the LED load 10), such that the LED load 10 may be operated in a constant current and emit light. In addition, the control chip may also perform a protection mechanism, such as over current protection (OCP) or over voltage protection (OVP) under specific load conditions according to a designer's configuration to protect the LED load 10, but the present invention is not limited thereto.

Figure 2:
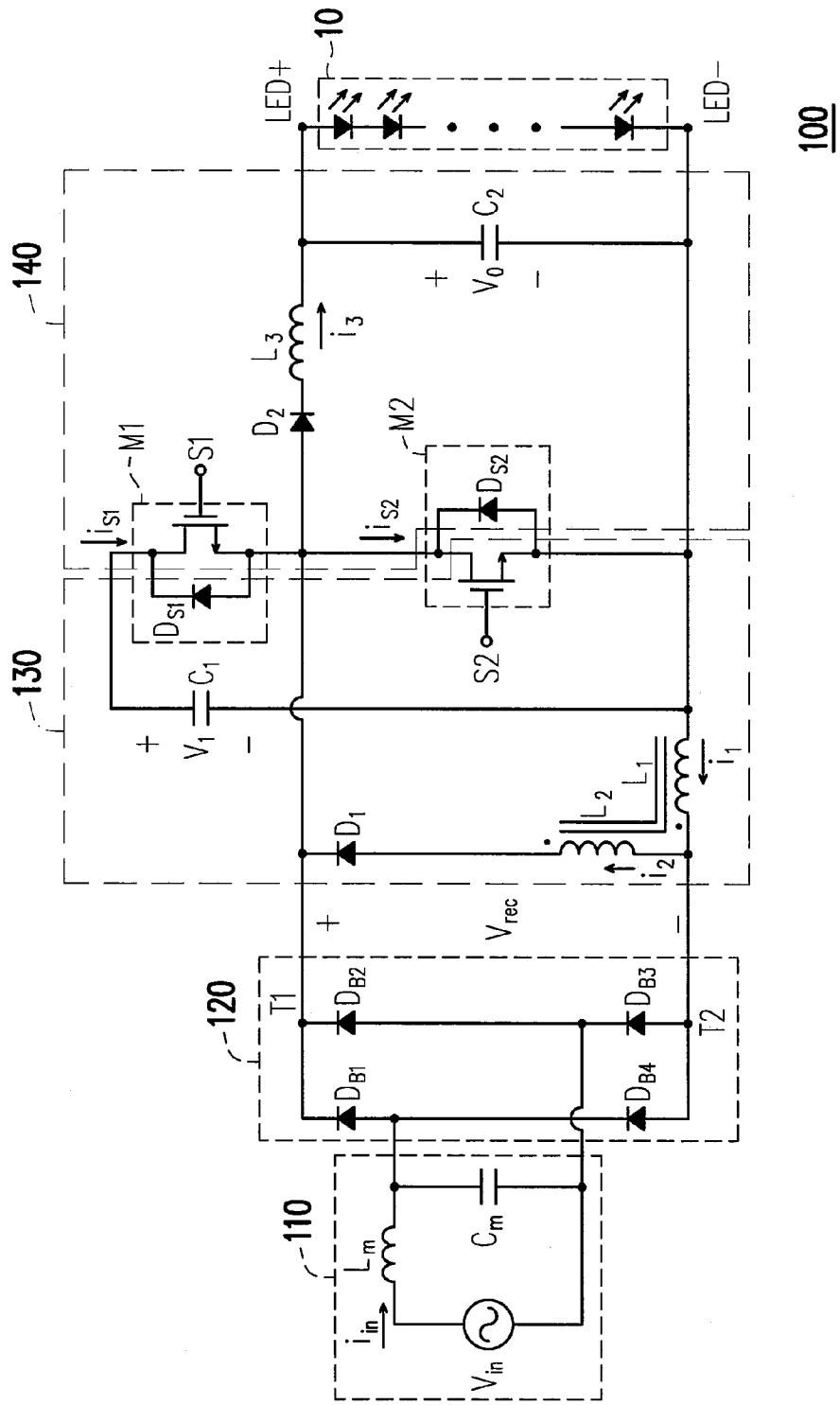
FIG. 2 schematically illustrates a circuitry of an LED driving circuit according to an embodiment of the present invention.

In order to clearly describe the specific structure of the LED driving circuit 100, FIG. 2 schematically illustrates a circuitry of an LED driving circuit according to an embodiment of the present invention. With reference to FIG. 2, in the present embodiment, the bridge rectifier 120 may further be implemented by utilizing a full bridge rectifier circuit structure composed of diodes $D_{B1} \sim D_{B4}$, the buck-boost converter 130 may be implemented by utilizing a circuit framework composed of transistors M1 and M2, a diode $D_1$, a capacitor $C_1$ and coupled inductors $L_1$ and $L_2$, and the buck converter 140 may be implemented by utilizing a circuit framework composed of the transistors M1 and M2, a diode $D_2$, a capacitor $C_2$ and an inductor $L_3$. Herein, an example where the transistors M1 and M2 are N-type transistors is illustrated, but the present invention is not limited thereto. Besides, the inductors L1 and L2 of the present embodiment are formed on the same magnetic core, but the present invention is also not limited thereto.

To be detailed, in the LED driving circuit 100, a cathode terminal of the diode D1 and an anode terminal of the diode D2 are jointly coupled to an output terminal T1 (i.e., a cathode terminal of the diodes $D_{B1}$ and $D_{B2}$) of the bridge rectifier 120. A first terminal of the inductor $L_1$ and a second terminal of the inductor $L_2$ are jointly coupled to an output terminal T2 (i.e., an anode terminal of the diodes $D_{B3}$ and $D_{B4}$) of the bridge rectifier 120. A second terminal of the inductor $L_1$ is coupled to a cathode terminal LED− of the LED load 10. A first terminal of the inductor $L_2$ is coupled to an anode terminal of the diode $D_1$. A first terminal of the inductor $L_3$ is coupled to a cathode terminal of the diode $D_2$, and a second terminal of the inductor $L_3$ is coupled to an anode terminal LED+ of the LED load 10. Gates of the transistors M1 and M2 respectively receive control signals S1 and S2, the source of the transistor M1 and the drain of the transistor M2 are jointly coupled to the output terminal T1 of the bridge rectifier 120, and the source of the transistor M2 is coupled to the cathode terminal LED− of the LED load 10. A first terminal of the capacitor $C_1$ is coupled to the drain of the transistor M1, a first terminal of the capacitor $C_2$ is coupled to the anode terminal LED+ of the LED load 10, and second terminals of the capacitors $C_1$ and $C_2$ are jointly coupled to the cathode terminal LED− of the LED load 10.

In the present embodiment, the buck-boost converter 130 and the buck converter 140 share the transistors M1 and M2 and are served as active switches. The control chip provides two control signal S1 and S2 having pulse-width modulation (PWM) characteristics and are complementary to each other to control the switching of the transistors M1 and M2, such that the inductors $L_1$, $L_2$ and $L_3$ and the capacitors $C_1$ and $C_2$ in the buck-boost converter 130 and the buck converter 140 are charged or discharged in response to the switching of the transistors M1 and M2. Thereby, the buck-boost converter 130 and the buck converter 140 perform boost/buck operation on the received DC voltage $V_{rec}$ and accordingly generate the driving voltage $V_O$ at the two terminals of the capacitor $C_2$ to drive the LED load (detailed operation aspects will be described in embodiments below).

Moreover, in the present embodiment, the transistors M1 and M2 actually have intrinsic body diodes (such as an intrinsic body diode $D_{S1}$ of the transistor M1 and a intrinsic body diode $D_{S2}$ of the transistor M2) that are inverted (with respect to a direction from the drain to the source) to and connected with each other in parallel based on diode characteristics of bodies of the transistors M1 and M2. Therein, cathode terminals of the intrinsic body diodes $D_{S1}$ and $D_{S2}$ of the transistors M1 and M2 are equivalently coupled to the drains of the transistors M1 and M2 respectively, and anode terminals of the intrinsic body diodes $D_{S1}$ and $D_{S2}$ of the transistors M1 and M2 are equivalently coupled to the sources of the transistors M1 and M2 respectively.

Aspects of operating the LED driving circuit 100 within a driven period $T_P$ according to embodiments of the present invention will be described with reference to FIGS. 3A~3F and FIG. 4 hereinafter. FIG. 3A~3F schematically illustrate equivalent circuits in different operation modes of the LED driving circuit according to an embodiment of the present invention. FIG. 4 schematically illustrates waveforms of the LED driving circuit according to an embodiment of the present invention. Here, in order to simplify the description, an embodiment where the AC voltage source 110 and the bridge rectifier 120 are equivalently coupled to a DC voltage source DS between the output terminals T1 and T2, and the LED load 10 is equivalent to the impedance $R_{LED}$ is illustrated in FIGS. 3A~3F for example.

In the present embodiment, an example where the control signals S1 and S2 have a dead time Td and a PWM signal with approximately 50% of duty ratio (in a condition where the dead time Td is ignored) is exemplarily illustrated. Both the control signals S1 and S2 are simultaneously in a low level within the dead time Td, such that both the transistors M1 and M2 are in an off state (e.g., the transistors M1 and M2 are P-type transistors, the control signals S1 and S2 are simultaneously in a high level within the dead time Td).

Figure 3A:
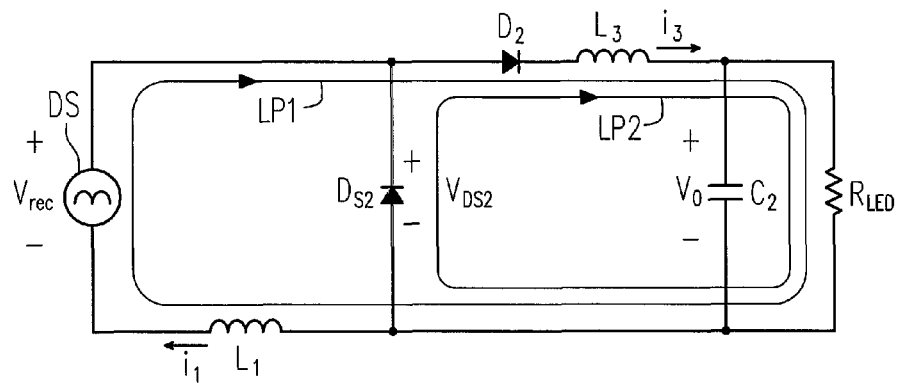
FIG. 3A-3F schematically illustrate equivalent circuits in different operation modes of the LED driving circuit according to an embodiment of the present invention.
Figure 4:
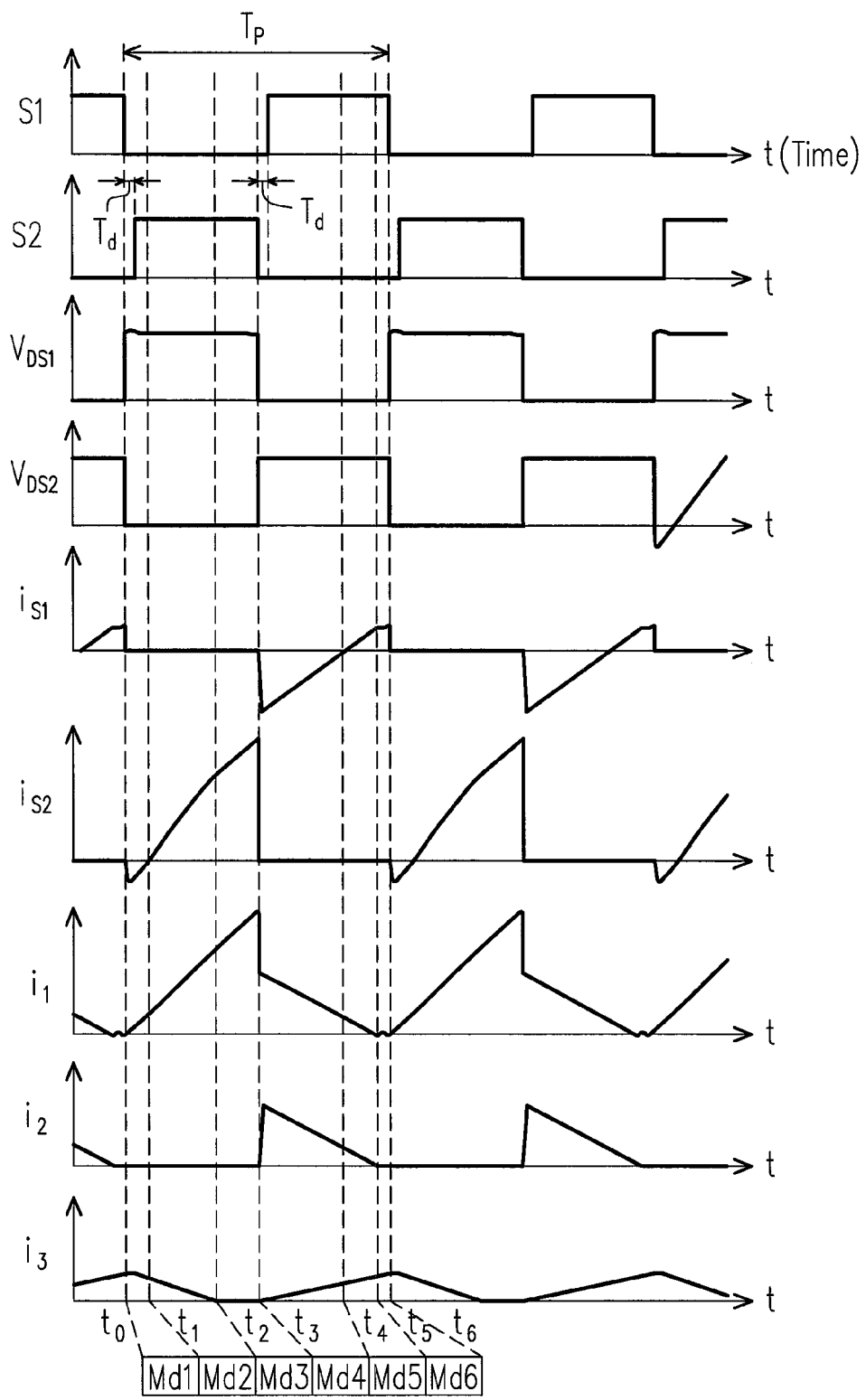
FIG. 4 schematically illustrates waveforms of the LED driving circuit according to an embodiment of the present invention.

First, with reference to both FIG. 3A and FIG. 4, before the LED driving circuit 100 enters a first operation mode Md1 (i.e., before a time $t_0$), the transistor M1 is still in an on state in response to the high-level control signal S1. When the control signal S1 is transferred from a high-level state to a low-level state at the time $t_0$, the LED driving circuit 100 enters the first operation mode Md1.

In the first operation mode Md1 (during a period from $t_0$ to $t_1$), the transistors M1 is first turned off in response to the low-level control signals S1 and S2 within the dead time Td, such that the inductors $L_1$ and $L_3$ respectively store and release power based on their cross voltages (the cross voltage of the inductor $L_1$ is the DC voltage $V_{rec}$, and the cross voltage of the inductor $L_3$ is a negative driving voltage $-V_O$).

In this operation mode, for maintaining continuity of output current $i_3$, not only a current loop LP1 is formed through the inductor $L_1$, the intrinsic body diode $D_{S2}$ of the transistor M2 is also turned on to form another current loop LP2. Therein, the current loop LP1 is formed by the inductor $L_3$, the capacitor $C_2$, the inductor $L_1$, the DC voltage source DS and the diode $D_2$, and the current loop LP2 is formed by the inductor $L_3$, the capacitor $C_2$, the intrinsic body diode $D_{S2}$ and the diode $D_2$.

After the dead time Td, even though the transistor M2 still receives a high-level control signal S2 at this time, the transistor M2 may not be turned on immediately due to the intrinsic body diode $D_{S2}$ of the transistor M2 still in the on state in response to the current on the loop LP1. Thus, even after the dead time Td, the transistor M2 would be maintained in an off state as long as the output current $i_3$ of the inductor $L_3$ is still greater than the output current $i_1$ of the inductor $L_1$. In other words, when the LED driving circuit 100 is operated during the period from $t_0$ to $t_1$ in the first operation mode Md1, the transistor M2 generates an inverted drain current $i_{s2}$ (from the source to the drain) based on the turned-on intrinsic body diode $D_{S2}$ and clamps a voltage $V_{DS2}$ of the drain/source to a voltage level (approximate to −0.7V (i.e., a negative on voltage of a diode)) approaching zero.

In addition, under the first operation mode Md1, the output current $i_1$ and $i_3$ of the inductors $L_1$ and $L_3$ are respectively expressed by formulas as follows:

$$i_1(t) = \frac{V_{rec}}{L_1}(t - t_0) \quad (1)$$

$$i_3(t) = i_3(t_0) - \frac{V_o}{L_3}(t - t_0) \quad (2)$$

It is known from the formulas (1) and (2) that the output current $i_1$ may be gradually increased during the period from $t_0$ to $t_1$ based on power storage of the inductor $L_1$, and the output current $i_3$ may be gradually decreased from a peak value during the period from $t_0$ to $t_1$ based on power release of the power inductor $L_3$. Additionally, the drain current $i_{S2}$ of the transistor M2 may be gradually decreased with the output current $i_3$. Under this operation mode, the initial output current $i_3$ of the inductor $L_3$ is greater than the initial output current $i_1$ of the inductors $L_1$, but gradually approach to each other over time. When the output current $i_1$ of the inductor $L_1$ is increased and become greater than the output current $i_3$, the LED driving circuit 100 enters from first operation mode Md1 to a second operation mode Md2.

Figure 3B:
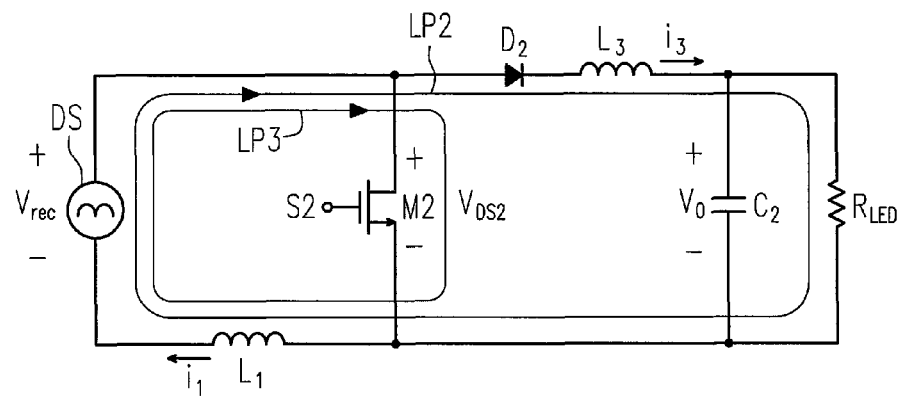

With reference to FIG. 3B and FIG. 4, under the second operation mode Md2 (during a period from $t_1$ to $t_2$), the inductor $L_1$ keeps storing power so as to keep increasing the output current $i_1$, and the inductor $L_3$ keeps releasing power so as to keep decreasing the output current $i_3$. At this time, the transistor M2 is turned on to form a current loop LP3, such that the intrinsic body diode $D_{S2}$ is correspondingly turned off to turn off the current loop LP1. The current loop LP3 is formed by the transistor M2, the inductor $L_1$ and the DC voltage source DS. Under this operation mode, the output current $i_1$ and $i_3$ of the inductors $L_1$ and $L_3$ may be likewise expressed by the formulas (1) and (2). When the output current $i_3$ of the inductor $L_3$ is decreased down to zero, the LED driving circuit 100 enters from the second operation mode Md2 to a third operation mode Md3.

Figure 3C:
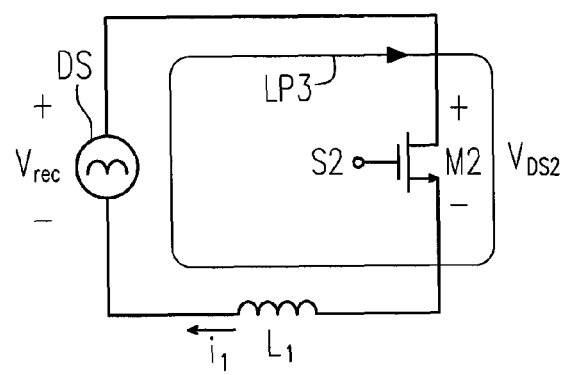

With reference to FIG. 3C and FIG. 4, under the third operation mode Md3 (during a period from $t_2$ to $t_3$), the output current $i_3$ of the inductor $L_3$ is zero, such that the current loop LP2 is turned off. The inductor $L_1$ keeps storing power in response to the DC voltage $V_{rec}$, such that the output current $i_1$ keeps being increased. When the control signal S2 is transferred from the high-level state to the low-level state at the time $t_3$, the LED driving circuit 100 enters from the third operation mode Md3 to a fourth operation mode Md4.

Figure 3D:
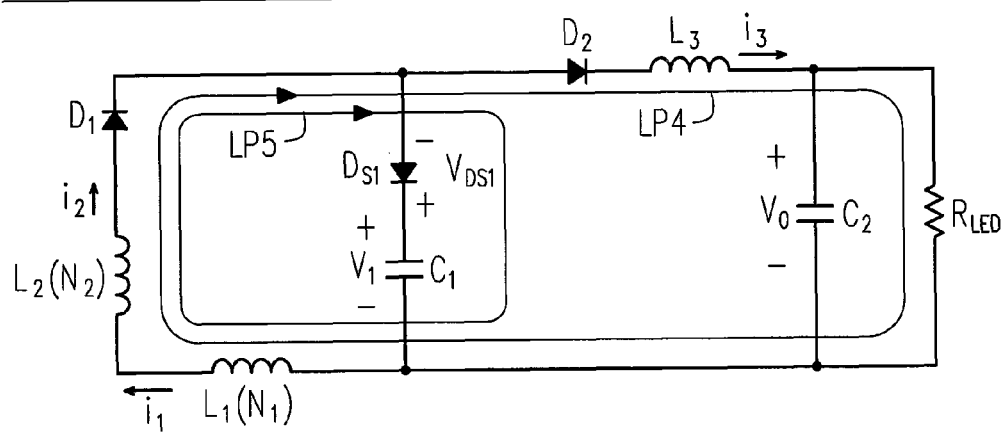

With reference to FIG. 3D and FIG. 4, under the fourth operation mode Md4 (during a period from $t_3$ to $t_4$), the transistor M2 is first turned off in response to the low-level control signal S2 within the dead time Td, such that the inductors $L_1$ and $L_3$ respectively releases and stores power based their individual cross voltages. Moreover, the inductor $L_2$ generates an output current $i_2$ identical to the output current $i_1$ when at the time $t_4$ of the fourth operation mode Md4 and releases power as inductor $L_1$ does during the period of the LED driving circuit 100 being operated in the fourth operation mode Md4.

Under this operation mode, in order to maintain the continuity of the magnetic flux in the inductors L1 and L2, not only a current loop LP4 is formed through the inductor $L_3$, but also the intrinsic body diode $D_{S1}$ of transistor M1 is turned on to form another current loop LP5. The current loop LP4 is formed by the inductor $L_1$, the inductor $L_2$, the diode $D_1$, the diode $D_2$, the inductor $L_3$ and the capacitor $C_2$, and the current loop LP5 is formed by the inductor $L_1$, the inductor $L_2$, the diode $D_1$, the intrinsic body diode $D_{S1}$ and the capacitor $C_1$.

After the dead time Td, even though the transistor M1 receives the high-level control signal S1, the transistor M1 may not be turned on immediately due to the intrinsic body diode $D_{S1}$ of the transistor M1 still in the on state in response to the current on the loop LP5. Thus, even after the dead time Td, the transistor M1 would be maintained in an off state as long as the output current $i_1$ (or $i_2$) of the inductor $L_1$ (or $L_2$) is still greater than the output current $i_3$ of the inductor $L_3$. In other words, when the LED driving circuit 100 is operated during the period from $t_3$ to $t_4$ in the fourth operation mode Md4, the transistors M1 generates an inverted drain current $i_{S1}$ (from the source to the drain) based on the turned-on intrinsic body diode $D_{S1}$ and clamps a $V_{DS1}$ of the drain/source to a voltage level approaching zero.

In the present embodiment, in order to form the current loops LP4 and LP5 by the current flowing through the inductor $L_2$ as expected, the cross voltage of the inductor $L_2$ has to be higher than the amplitude of the AC voltage $V_{in}$. Thus, the relationship between the inductors $L_1$ and $L_2$ has to satisfy the following formula:

$$\left(\frac{N_2}{N_1+N_2}\right)V_1 \geq V_m \qquad (3)$$

Therein, N1 and N2 are respectively coil turns of the inductors $L_1$ and $L_2$, $V_1$ is the cross voltage of the capacitor $C_1$, and $V_m$ is the amplitude of the AC voltage $V_{in}$.

As long as the inductors $L_1$ and $L_2$ are designed to satisfy the aforementioned formula, the diodes $D_{B1}$~$D_{B4}$ of the bridge rectifier 120 would be turned off by a reverse bias voltage, such that the output current $i_1$ of the inductor $L_1$ flows into the inductor $L_2$ to form the current loops LP4 and LP5.

Moreover, under the fourth operation mode Md4, the output current $i_1$ or $i_2$ and $i_3$ of the inductors $L_1$ or $L_2$ and $L_3$ may be respectively expressed by formulas as follows:

$$i_1(t) = i_2(t) = \frac{N_1}{N_1+N_2}\frac{V_{rec}}{L_1}(t_3-t_0) - \left(\frac{N_1}{N_1+N_2}\right)^2\frac{V_1}{L_1}(t-t_3) \qquad (4)$$

$$i_3(t) = i_3(t_3) + \frac{V_1-V_o}{L_3}(t-t_3) \qquad (5)$$

It is known from the formulas (4) and (5) that the output current $i_1$ or $i_2$ may be gradually decreased from a peak value during the period from $t_3$ to $t_4$ based on power release of the inductor $L_1$ or $L_2$, and the output current $i_3$ may be gradually increased during the period from $t_3$ to $t_4$ based on power storage of the inductor $L_3$. Additionally, the drain current $i_{S1}$ of the transistor M1 may be gradually decreased with the output current $i_1$ or $i_2$. Under this operation mode, the initial output currents $i_1$ and $i_2$ of the inductors $L_1$ and $L_2$ are greater than the initial output current $i_3$ of the inductor $L_3$, but gradually approach to each other over time. When the output current $i_3$ of the inductor $L_3$ is increased and become greater than the output current $i_1$ or $i_2$, the LED driving circuit 100 enters from the fourth operation mode Md4 to a fifth operation mode Md5.

Figure 3E:
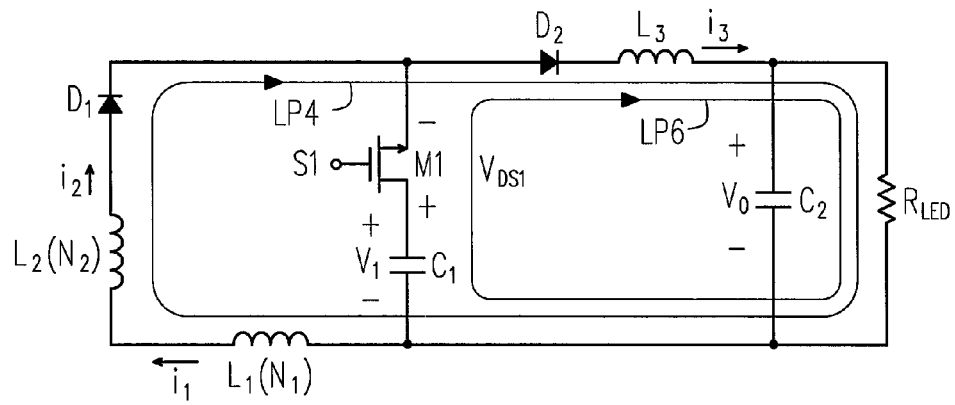

With reference to FIG. 3E and FIG. 4, under the fifth operation mode Md5 (during a period from $t_4$ to $t_5$), the inductor $L_3$ keeps storing power, such that the output current $i_3$ thereof is increased, and the inductors $L_1$ and $L_2$ keep releasing power, such that the output currents $i_1$ and $i_2$ keeps being decreased. At this time, the transistor M1 is turned on to form a current loop LP6, such that the intrinsic body diode $D_{S1}$ is correspondingly turned off to turn off the current loop LP5. The current loop LP6 is formed by the transistor M1, the diode $D_2$, the inductor $L_3$, the capacitor $C_2$ and the capacitor $C_1$. Under the fifth operation mode Md5, the output current $i_1$, $i_2$ and $i_3$ of the inductors $L_1$, $L_2$ and $L_3$ may be likewise expressed by the formulas (4) and (5). When the output currents $i_1$ and $i_2$ of the inductors $L_1$ and $L_2$ are decreased down to zero, the LED driving circuit 100 enters form the fifth operation mode Md5 to a sixth operation mode Md6.

Figure 3F:
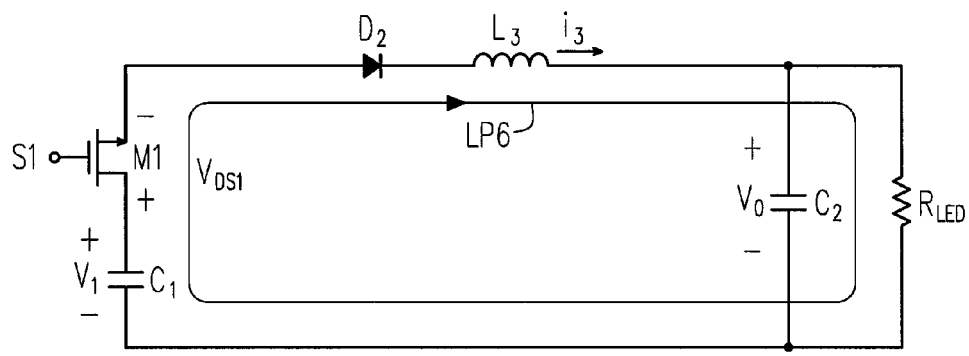

With reference to FIG. 3F and FIG. 4, in the sixth operation mode Md3 (during a period from $t_5$ to $t_6$), the output currents $i_1$ and $i_2$ of the inductors $L_1$ and $L_2$ are zero, such that the current loop LP4 is turned off. The inductor $L_3$ keeps storing power in response to the cross voltage $V_1$ of the capacitor $C_1$, such that the output current $i_3$ keeps being increased. When the control signal S1 is transferred from the high-level state to the low-level state at the time $t_6$, the LED driving circuit 100 ends the driven period $T_P$ and enters the first operation mode Md1 of the next driven period at the next time point.

With reference to FIG. 2 again, viewing from another aspect, the operation period from $t_0$ to $t_3$ in the first through the third operation modes Md1~Md3 described in the above embodiments may be an operation period for serving the buck-boost converter 130 as a power factor corrector (PFC). In detail, when the LED driving circuit 100 is operated during the period from $t_0$ to $t_3$ in the first through the third operation modes, the transistor M2 and the intrinsic body diode $D_{S2}$ are turned on with each other, such that the inductor $L_1$ stores power in response to the power provided by DC voltage $V_{rec}$ and gradually increases the output current $i_1$ thereof. Herein, an AC current $i_{in}$ output by the AC voltage source 110 may be expressed by the following formula:

$$i_{in}(t) = \frac{V_m T_P}{8L_1}\sin(2\pi f_L^t) \quad (6)$$

Therein, $V_m \sin(2\pi f_L^t)$ is the AC voltage $V_{in}$. Thus, it is known from the formula (6) that during the operation period of the buck-boost converter 130, the AC current $i_{in}$ output by the AC voltage source 110 has the same phase as the AC voltage $V_{in}$, and thus, the buck-boost converter 130 has characteristics for providing high power factors.

Moreover, in the present embodiment, the buck-boost converter 130 is operated in the discontinuous conduction mode (DCM) and thus, has the aforementioned characteristics for providing high power factors. Thus, as long as the coil turns of the inductors $L_1$ and $L_2$ satisfy the formula (3), the buck-boost converter 130 may be operated in the DCM.

On the other hand, the operation period from $t_4$ to $t_6$ in the fourth through the sixth operation modes Md4~Md6 may be served as an operation period for the buck converter 140 to store power. In detail, when the LED driving circuit 100 is operated during the period from $t_4$ to $t_6$ in the fourth through the sixth operation modes, the transistors M1 and the intrinsic body diode $D_{S1}$ are turned on with each other. Thereby, the inductor $L_3$ stores power in response to the power provided by the cross voltage $V_1$ of the capacitor $C_1$ to gradually increase the output current $i_3$ thereof and provides power, charge the capacitor $C_2$ and provide power to the LED load 10. Otherwise, during the off period $t_0$~$t_3$ of the buck converter 140, the buck converter 140 provides power to the LED load 10 by discharging the capacitor $C_2$. Accordingly, the buck converter 140 may charge or discharge the capacitor $C_2$ during the driven period $T_P$ so as to generate the stable driving voltage $V_O$ for driving the LED load 10.

It is to be noticed that in the description in regard to the operation modes, examples where both the buck-boost converter 130 and the buck converter 140 are operated in the DCM are exemplarily illustrated. However, the buck converter 140 according to other embodiments of the present invention may also be operated in a continuous conduction mode (CCM), and the present invention is not limited thereto.

For instance, if the buck converter 140 is operated in the continuous conduction mode (CCM), the LED driving circuit 100 does not enter the third operation mode Md3 after entering the second operation mode Md2, but instead, keeps being operated in the second operation mode Md2 for the inductor $L_3$ to keep releasing power until the transistor M2 is turned off in response to the low-level control signal S2. Then, the LED driving circuit 100 directly enters the fourth operation mode Md4.

Furthermore, in order to design the buck converter 140 to be operated in the CCM, an inductance value of the inductor $L_3$ has to satisfy the following formula:

$$L_3 \geq \frac{T_P R_{LED}}{4} \quad (7)$$

Otherwise, in order to design the buck converter 140 to be operated in the DCM, an inductance value of the inductor L3 has to satisfy the following formula:

$$L_3 = \frac{(V_1 - V_O)V_1 T_P R_{LED}}{8V_O^2} \quad (8)$$

Therein, $L_3$ is an inductance value of the inductor L3, $T_P$ is a period of the control signal S1 or S2, $R_{LED}$ is an impedance of a LED load, $V_1$ is a cross voltage of the capacitor $C_1$, and $V_O$ is a cross voltage (i.e., a driving voltage) of the capacitor $C_2$.

To sum up, the embodiments of the present invention provides an LED driving circuit capable of achieving a zero-voltage switching-on (ZVS) control mechanism by using diode characteristics of existing active switches through specific circuit configurations and the selection of circuit parameters. The LED driving circuit can have the ZVS feature without configuring additional auxiliary circuits or snubber circuits and thus, can effectively reduce the design and production cost of the LED driving circuit.

Although the invention has been described with reference to the above embodiments, it will be apparent to one of ordinary skill in the art that modifications to the described embodiment may be made without departing from the spirit of the invention. Accordingly, the scope of the invention will be defined by the attached claims not by the above detailed descriptions.

What is claimed is:

1. A light emitting diode (LED) driving circuit, suitable for driving an LED load, comprising:
    an AC voltage source, providing an AC voltage;
    a bridge rectifier, coupled to the AC voltage source and configured to rectify the AC voltage so as to generate a corresponding DC voltage between a first output terminal and a second output terminal of the bridge rectifier;
    a first and a second diodes, wherein a cathode terminal of the first diode and an anode terminal of the second diode are jointly coupled to the first output terminal of the bridge rectifier;
    a first, a second and a third inductors, wherein a first terminal of the first inductor and a second terminal of the second inductor are jointly coupled to the second output terminal of the bridge rectifier, a second terminal of the first inductor is coupled to a cathode terminal of the LED load, a first terminal of the second inductor is coupled to an anode terminal of the first diode, a first terminal of the third inductor is coupled to a cathode terminal of the second diode, and a second terminal of the third inductor is coupled to an anode terminal of the LED load;

a first and a second transistors, wherein a gate of the first transistor and a gate of the second transistor respectively receive a first control signal and a second control signal, a second source/drain of the first transistor and a first source/drain of the second transistor are jointly coupled to the first output terminal of the bridge rectifier, and a second source/drain of the second transistor is coupled to the cathode terminal of the LED load; and a first and a second capacitors, wherein a first terminal of the first capacitor is coupled to a first source/drain of the first transistor, a first terminal of the second capacitor is coupled to the anode terminal of the LED load, and a second terminal of the first capacitor and a second terminal of the second capacitor are jointly coupled to the cathode terminal of the LED load.

2. The LED driving circuit according to claim 1, wherein the first control signal and the second control signal are complementary pulse-width modulation (PWM) signals to each other, a dead time is between the first control signal and the second control signal, and both the first control signal and the second control signal are disabled within the dead time.

3. The LED driving circuit according to claim 2, wherein the first transistor and the second transistor respectively switch conduction states in response to the first control signal and the second control signal, such that the inductors and the capacitors are charged or discharged in response to the switching operation of the first transistor and the second transistor, and a driving voltage is generated at the two terminals of the second capacitor.

4. The LED driving circuit according to claim 1, wherein the first transistor, the second transistor, the first diode, the first capacitor, the first inductor and the second inductors are configured to form a buck-boost converter.

5. The LED driving circuit according to claim 4, wherein the buck-boost converter is operated in a discontinuous conduction mode (DCM).

6. The LED driving circuit according to claim 1, wherein the first transistor, the second transistor, the second diode, the second capacitor and the third inductor are configured to form a buck converter.

7. The LED driving circuit according to claim 6, wherein the buck converter is operated in a discontinuous conduction mode (DCM), and an inductance value of the third inductor satisfies:

$$L_3 = \frac{(V_1 - V_O)V_1 T_P R_{LED}}{8V_O^2},$$

wherein $L_3$ is the inductance value of the third inductor, $T_P$ is a period of the first control signal or the second control signal, $R_{LED}$ is an impedance of the LED load, $V_1$ is a cross voltage of the first capacitor, and $V_O$ is a cross voltage of the second capacitor.

8. The LED driving circuit according to claim 6, wherein the buck converter is operated in a continuous conduction mode (CCM), and an inductance value of the third inductor satisfies:

$$L_3 \geq \frac{T_P R_{LED}}{4},$$

wherein $L_3$ is the inductance value of the third inductor, $T_P$ is a period of the first control signal or the second control signal, and $R_{LED}$ is an impedance of the LED load.

9. The LED driving circuit according to claim 1, wherein the first inductor and the second inductor satisfy:

$$\left(\frac{N_2}{N_1 + N_2}\right)V_1 \geq V_m,$$

wherein $N_1$ and $N_2$ are respectively coil turns of the first inductor and the second inductor, $V_1$ is a cross voltage of the first capacitor, and $V_m$ is an amplitude of the AC voltage.

* * * * *